US012284983B2

(12) United States Patent
Crompton

(10) Patent No.: US 12,284,983 B2
(45) Date of Patent: Apr. 29, 2025

(54) ANIMAL CLEANING, DRYING AND/OR TREATMENT APPARATUS

(71) Applicant: Kromies Ltd, Wigan (GB)

(72) Inventor: Kenneth Crompton, Wigan (GB)

(73) Assignee: KROMIES LTD, Wigan (GB)

( * ) Notice: Subject to any disclaimer, the term of this patent is extended or adjusted under 35 U.S.C. 154(b) by 67 days.

(21) Appl. No.: 17/997,309

(22) PCT Filed: Apr. 26, 2021

(86) PCT No.: PCT/GB2021/051006
§ 371 (c)(1),
(2) Date: Oct. 27, 2022

(87) PCT Pub. No.: WO2021/219983
PCT Pub. Date: Nov. 4, 2021

(65) Prior Publication Data
US 2023/0165216 A1 Jun. 1, 2023

(30) Foreign Application Priority Data

| Apr. 30, 2020 | (GB) | ................................. | 2006416 |
| Jun. 19, 2020 | (GB) | ................................. | 2009382 |
| Jul. 14, 2020 | (GB) | ................................. | 2010850 |
| Oct. 16, 2020 | (GB) | ................................. | 2016435 |

(51) Int. Cl.
A01K 13/00 (2006.01)
(52) U.S. Cl.
CPC .......... A01K 13/001 (2013.01); A01K 13/003 (2013.01)

(58) Field of Classification Search
CPC ....... A01K 13/001; A01K 13/003; A01K 7/00
See application file for complete search history.

(56) References Cited

U.S. PATENT DOCUMENTS

| 4,020,796 A | * | 5/1977 | Grifa | ................. | A01K 13/001 119/671 |
| 4,382,424 A | | 5/1983 | Altissimo | | |
| 4,930,453 A | | 6/1990 | Laliberte | | |
| 5,448,966 A | * | 9/1995 | McKinnon | ........... | A01K 13/001 119/676 |

(Continued)

FOREIGN PATENT DOCUMENTS

| CA | 3109975 A1 * | 9/2021 | ........... A01K 13/001 |
| JP | H10313725 A | 12/1998 | |

(Continued)

OTHER PUBLICATIONS

International Preliminary Report on Patentability in PCT/GB2021/051006, issued Oct. 27, 2022, 13 pages.

Primary Examiner — Ebony E Evans
(74) Attorney, Agent, or Firm — McKee, Voorhees & Sease, PLC

(57) ABSTRACT

The invention relates to apparatus and a method for performing cleaning, treatment and/or drying of an animal, such as a pet animal, with the apparatus including a housing and base defining a cavity in which the said animal is located, a supply of liquid, means for dispensing the liquid into the said cavity and onto the said animal and a drainage assembly to allow the liquid to be removed from the said cavity. Drying means can also be provided to allow the animal's coat to be dried whilst in the cavity.

27 Claims, 15 Drawing Sheets

(56) References Cited

U.S. PATENT DOCUMENTS

| | | | |
|---|---|---|---|
| 8,904,965 B1* | 12/2014 | Redick | A01K 13/001 119/753 |
| 10,051,836 B1* | 8/2018 | Tannis | A01K 13/001 |
| 11,272,688 B2* | 3/2022 | Kim | A01K 13/001 |
| 11,582,950 B2* | 2/2023 | Kim | A01K 15/04 |
| 2007/0289548 A1* | 12/2007 | Smoot | A01K 13/001 119/668 |
| 2016/0128302 A1* | 5/2016 | Stauber | A01K 13/001 119/671 |
| 2017/0094939 A1* | 4/2017 | Wright | A01K 13/001 |

FOREIGN PATENT DOCUMENTS

| | | | |
|---|---|---|---|
| JP | H11299382 A | 11/1999 | |
| KR | 101913963 B1 * | 9/2018 | A01K 13/001 |

* cited by examiner

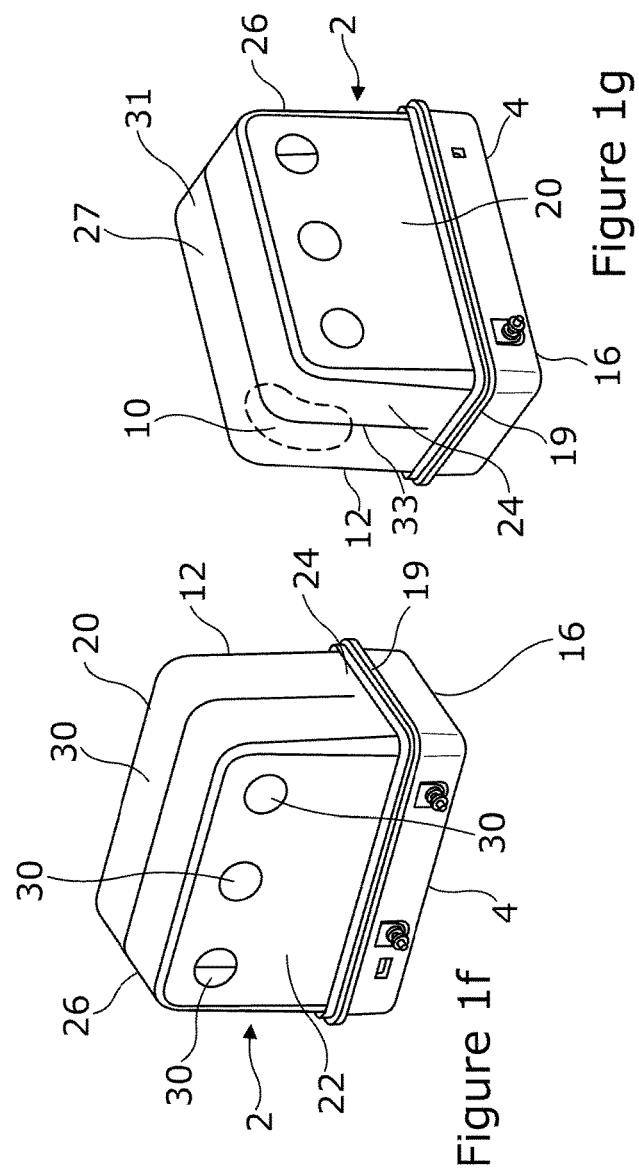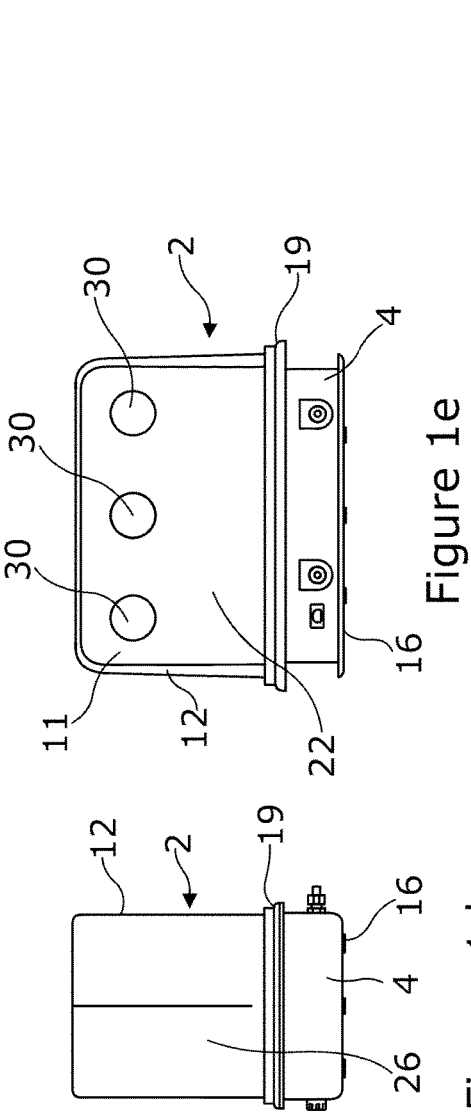

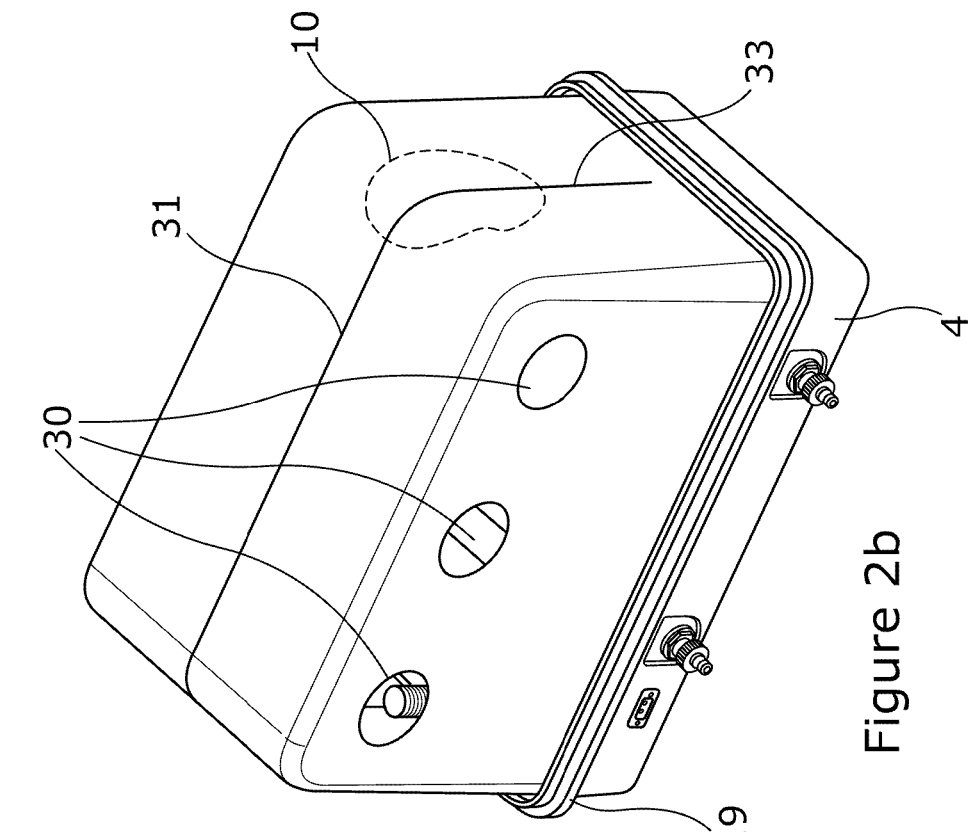
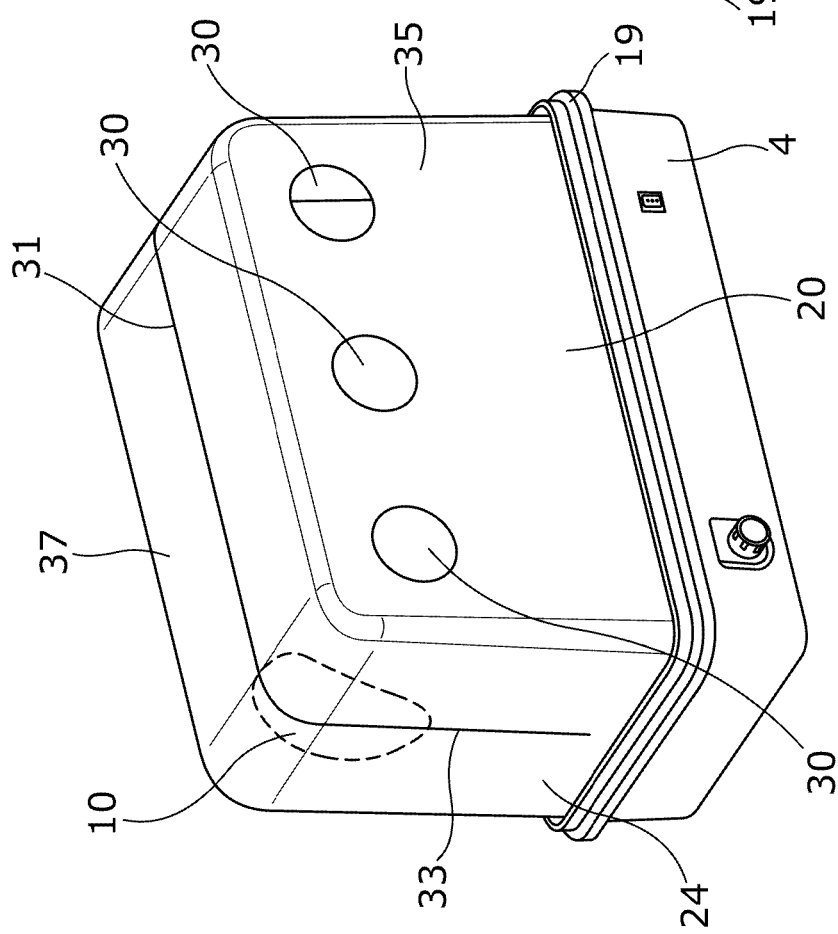
Figure 2b
Figure 2a

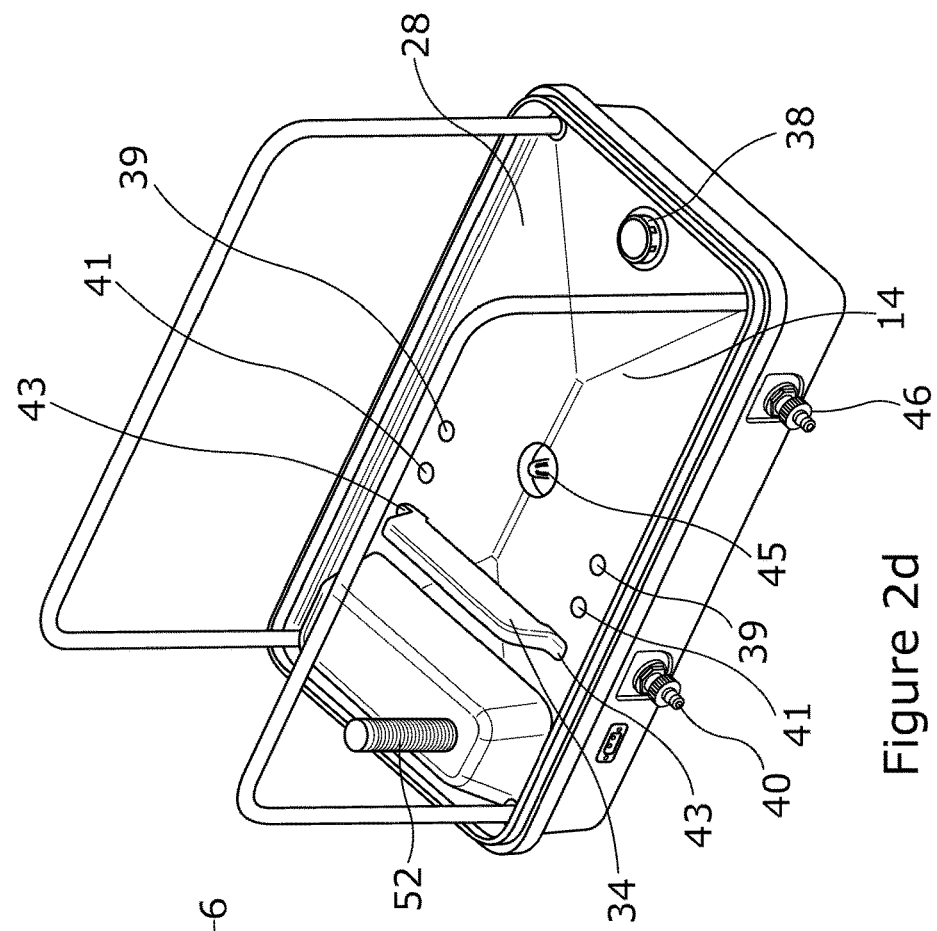
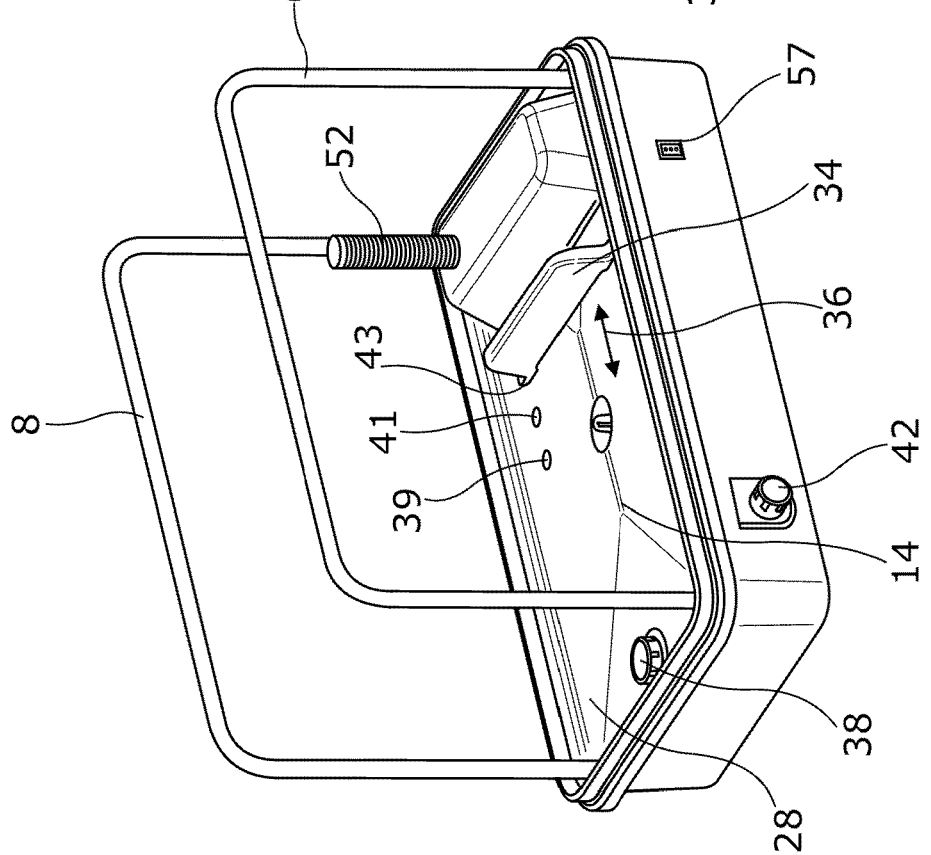
Figure 2d
Figure 2c

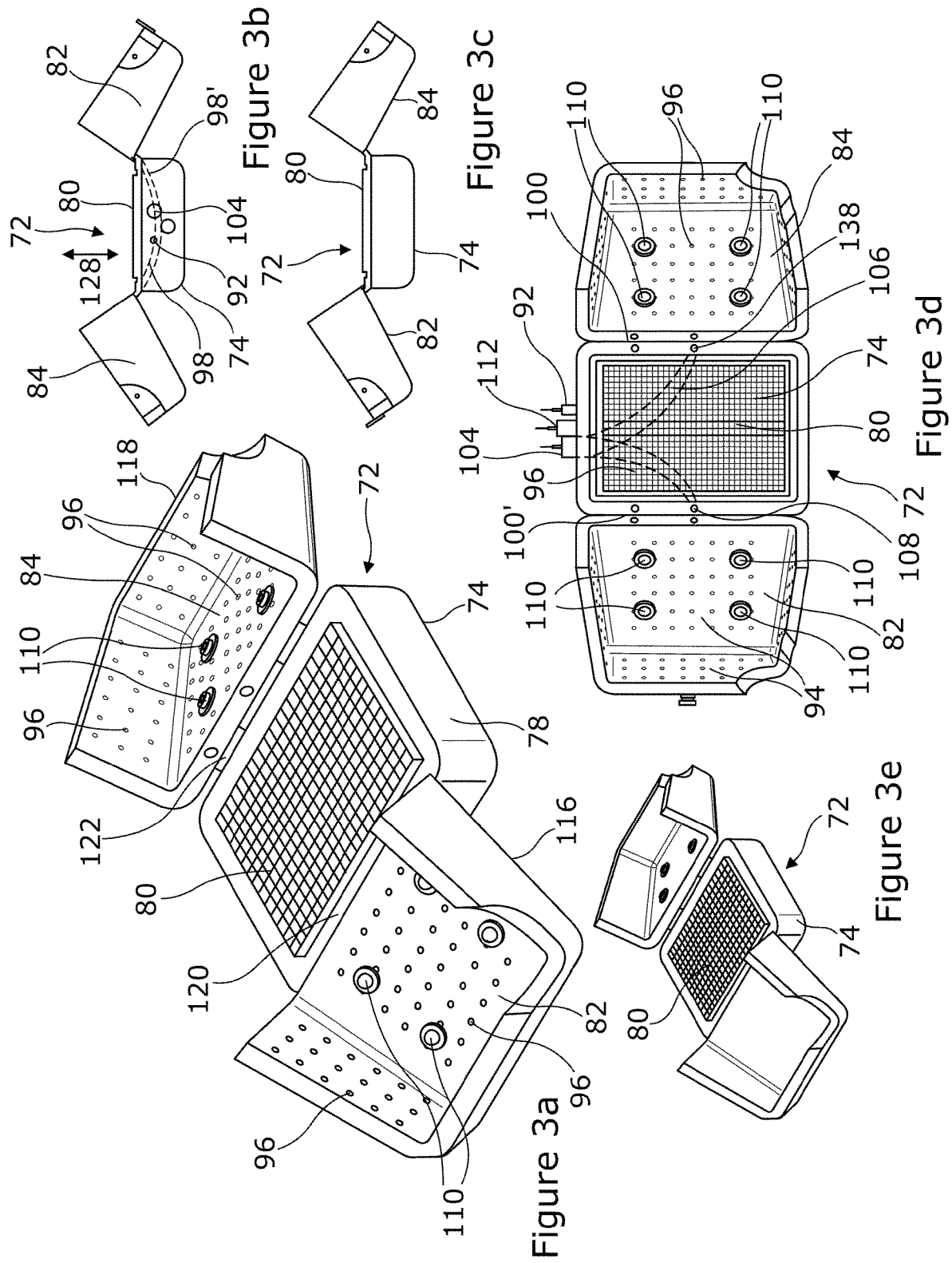

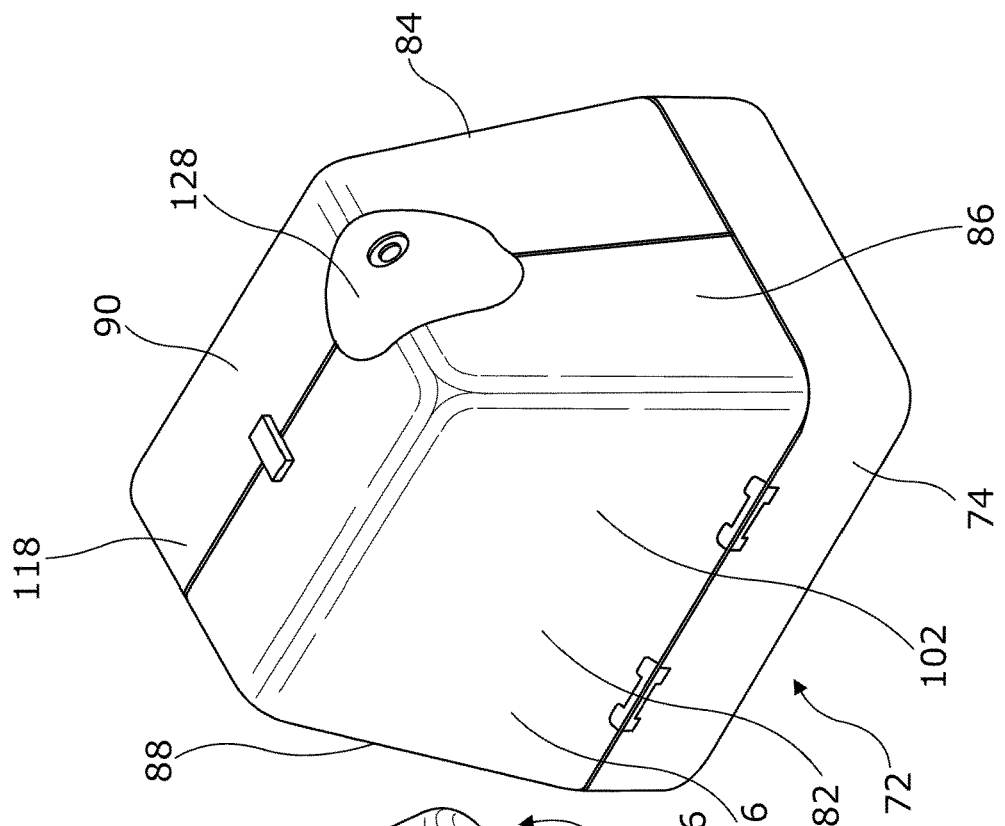
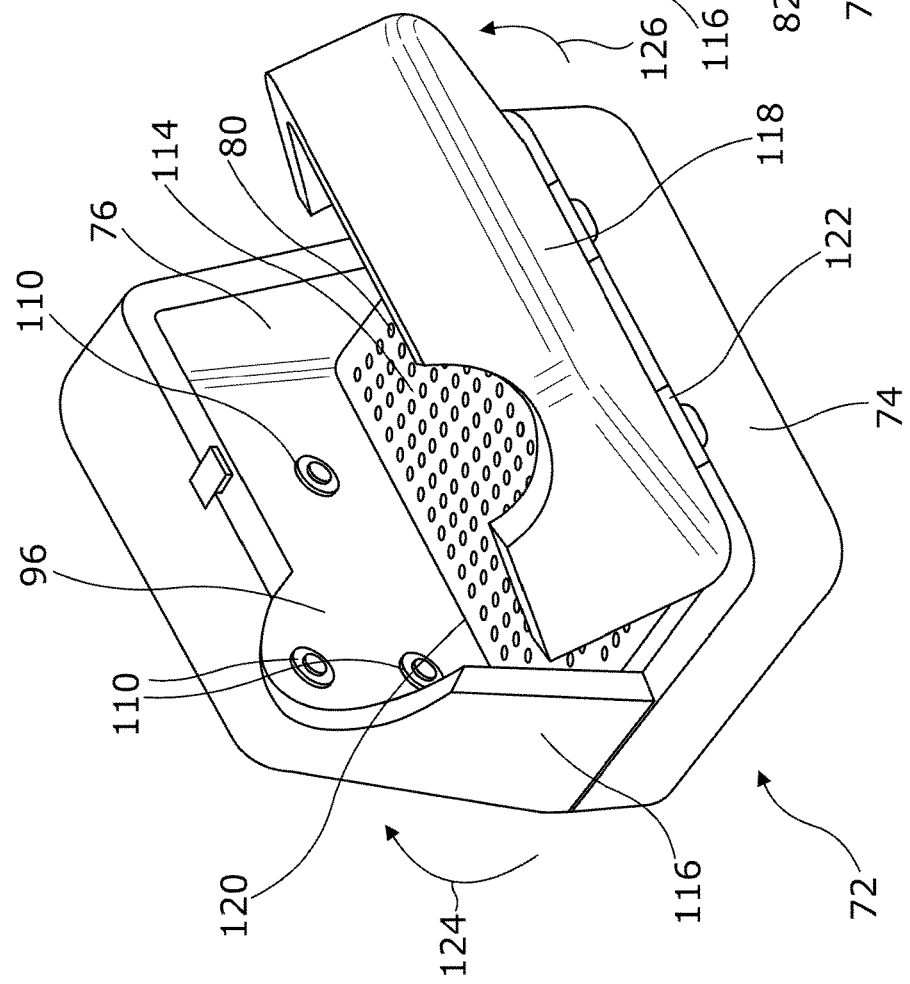

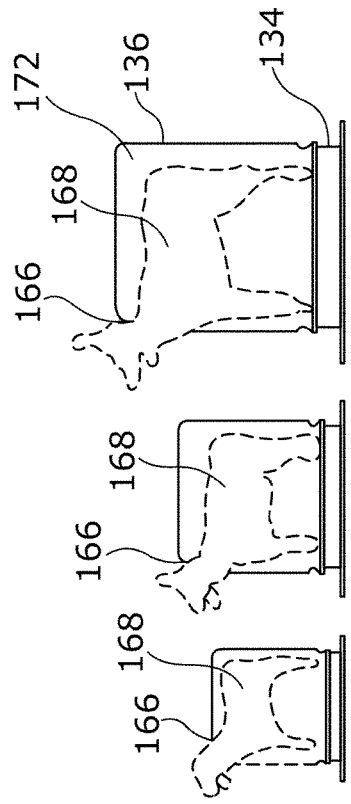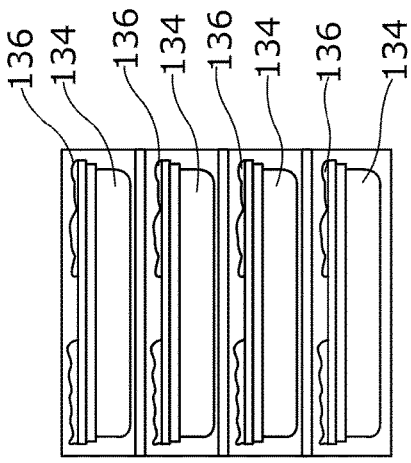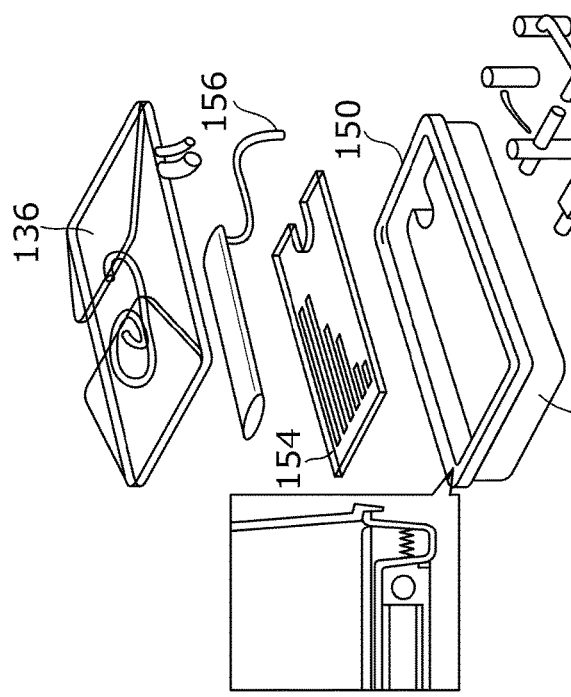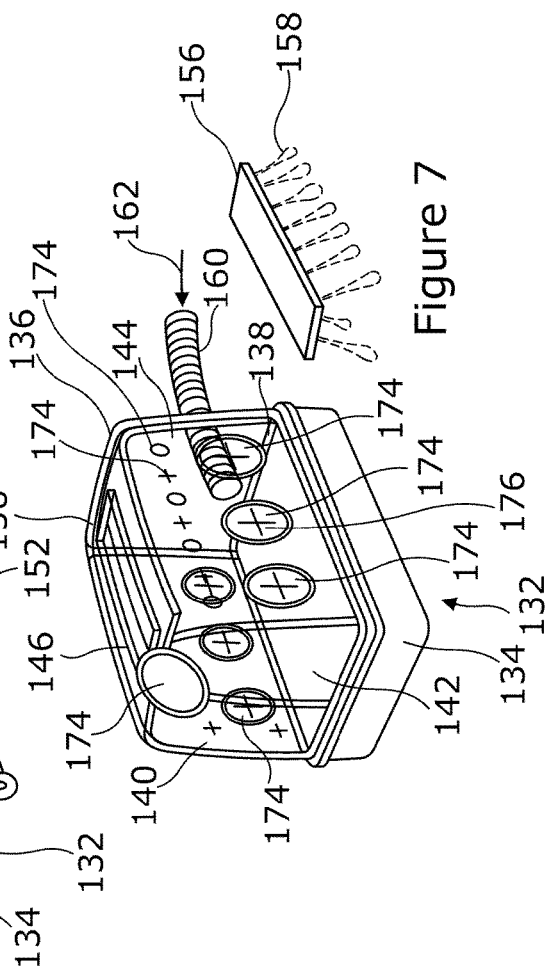

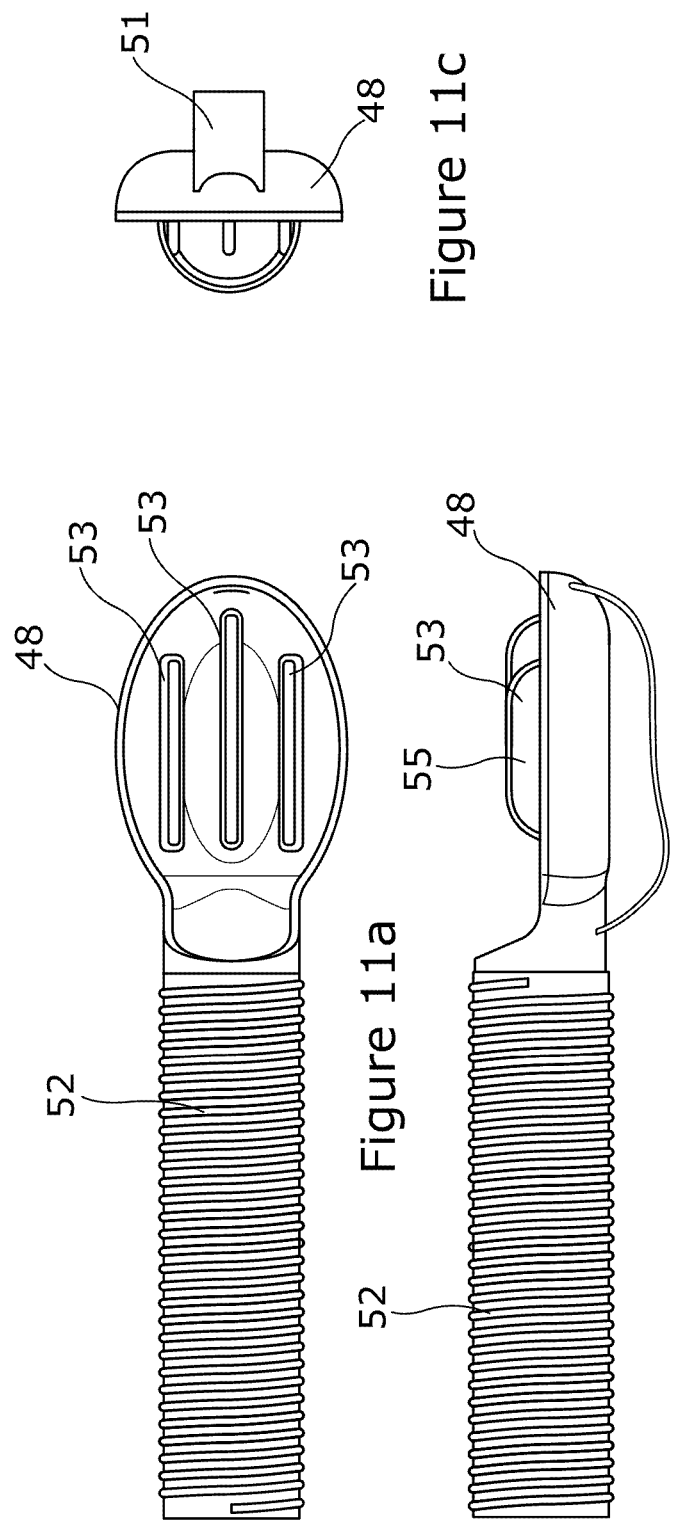

ANIMAL CLEANING, DRYING AND/OR TREATMENT APPARATUS

CROSS REFERENCE TO RELATED APPLICATIONS

This is a U.S. National Phase application claiming priority to PCT/GB2021/051006, filed Apr. 26, 2021, which claims priority to British application Nos. 2006416.8, filed Apr. 30, 2020, 2009382.9, filed Jun. 19, 2020, 2010850.2, filed Jul. 14, 2020, and 2016435.6, filed Oct. 16, 2020 the entire contents of which are hereby incorporated by reference in their entirety.

The invention to which this application relates is to an improvement to apparatus which is for use in the washing, cleaning and/or provision of treatments to animals. In particular, although not necessarily exclusively, the apparatus is directed towards use with animals which are pets and the apparatus can be provided in one form in which, for example, the same can be used in a domestic premises by the owner of the pet such as for example a dog or cat or in a commercial premises or business in which the owners of the animal pays for the service.

One of the problems which owners of pets frequently experience is that if their pet has access to the garden and/or is taken out for walks, they frequently become dusty, muddy and generally can require to be washed in order to prevent the mud, dust and debris from entering the premises along with the animal. At best the mud, dust and debris can be unsightly and, at worst can cause specific damage and staining of items of furniture, carpets, paintwork or the like.

In order to avoid this problem, the owner of the animal will typically attempt to wash down the animal externally of the premises, but this can be a relatively haphazard exercise due to the attempts of the movement of the animal away from the source of water, and is especially problematic in poor weather conditions and in which it can be the case that the animal is equally as muddy after the attempt of washing as it was prior to washing.

As a result, it is most commonly the case that the animal is brought into the premises and placed in a sink or in a wash area and water, and possibly shampoo is added to the coat of the animal to wash the same. At other times, or in combination with the washing, there is a need to apply treatments to the animal for their well-being to be upheld and which is achieved by the application onto the animal's coat of a treatment of chemicals and/or medicines for the application of a treatment to the animal.

However even though the space in which the animal is washed in the premises may be more confined, the animal may still try and avoid the water or shampoo or treatment and, if successful, can cause the spread of water and other liquids in the area surrounding the washing location or possibly into other areas of the premises. Furthermore, the animal will typically shake after the washing has been completed and this can then cause water droplets to be sprayed around the premises onto paintwork and furniture and cause damage. A further problem is that the washing of the animal can be stressful, both to the owner and animal.

It will therefore be appreciated that the washing and treatment of animals can be very difficult to achieve to the desired extent and there is a risk that the washing or treatment activity can itself cause damage to the surrounding items, paintwork and carpets in the premises and possible injury to the animal. However, despite these problems, the methods of washing and treating pets and animals has largely been unchanged for many years.

An aim of the present invention is to provide apparatus which allows the washing and/or provision of a treatment to an animal to be performed in a more controlled manner and therefore reduce the risk of damage being caused to the surrounding environment or injury being caused to the animal and generally reduce the stress to the animal and person so as to allow a more effective performance of the activity. A further aim is to allow the steps of washing and/or treatment and/or drying to be more controlled than is conventionally achieved, thereby potentially shortening the length of the procedure and, again, reducing the level of stress which is caused to the animal, and the person. A yet further aim is to allow the washing and/or treatment which is performed to be more effective in that when the animal has been washed the owner can be more certain that the animal will not subsequently cause damage to the surrounding environment and/or that the treatment which has been applied, has been applied properly and will therefore have the desired effect on the animal. A further aim is to allow effective cleaning and/or treatment of the animal to be achieved by the owner of the animal and without the need for the owner to take the animal to, and pay for, a specialised grooming company.

In a first aspect of the invention there is provided apparatus for performing cleaning, treatment and/or drying of an animal, said apparatus including a housing and base defining a cavity in which the said animal is located, a supply of liquid, means for dispensing the liquid into the said cavity and onto the said animal and a drainage assembly to allow the liquid to be removed from the said cavity.

In one embodiment the said apparatus includes one or more inlets for introducing air into the housing cavity to be used to dry the animal and/or remove debris from the animal coat including typically skin, hair or fur. Typically directing means are provided to direct the air onto the said animal while positioned in the cavity. In one embodiment the said air may be heated prior to being introduced to the apparatus or the apparatus includes at least one heater through or past which the air passes so that heated air is applied to the animal. In one embodiment the apparatus includes a pump to propel the air through the cavity and thereby increase the drying effect.

In one embodiment the air, water and/or treatment supply passes to a hand held portion which can be moved and positioned within the cavity by the user to thereby perform a more efficient and effective operation on the animal. Typically it is air which is dispensed via the hand held portion and allows the same to be moved to be used in a similar manner to a hair dryer apparatus. In one embodiment the air may be heated.

In one embodiment the said drainage assembly is located at a base of the housing and includes a floor on which the animal stands, sits or lies and one or a plurality of channels which allow the liquid to drain from the floor and either be stored in a collection container to be emptied at a later time after the washing or treatment has been performed and/or drain from the apparatus during the washing or treatment.

In one embodiment the source of the water is a mains water supply connected to an inlet of the apparatus and from which the water passes to dispensing outlets in the cavity. In an alternative embodiment the water supply is from a container and a pump may be provided to pump the water to the apparatus to be dispensed and thereby allow the apparatus to be used remotely from any mains water supply.

In one embodiment at least one portion of the housing and/or the floor is selectively movable so as to allow the apparatus to be range taking by altering the size of the cavity and thereby allow the apparatus to be used for different sized animals within a range of possible sizes. In one embodiment different sizes of apparatus may be provided to accommodate different ranges of sizes of animals.

In one embodiment the movement of the floor and/or walls of the housing allows the height and/or length of the cavity to be adjustable and thereby allow the animal, when positioned on the floor, to be moved to a location in the cavity which best suits the washing, treatment and/or drying of the same.

Typically the floor of the housing is located on a base and a space is defined under said floor, by said floor, side walls which depend downwardly from the floor, and a base wall which contacts with a support surface on which the apparatus is located.

In one embodiment the remainder of the housing is formed by support members and flexible sheet material retained in position by said support members and which defines, with the floor, the side, end and top walls of the cavity in which the animal is located.

In another embodiment the housing is defined by relatively rigid side walls, end walls and a top wall which, with the floor, define the cavity therein.

In one embodiment supply channels which connect with the inlets for the supply of liquid and/or air from externally of the housing to the cavity internally of the housing are located in the said base and/or support members of the housing.

In one embodiment the liquid dispensing means are located at spaced intervals on the support members and the air dispensing means is selectively movable around the cavity by the user gripping a hand held portion which is connected to a flexible hose and in turn to pump means.

The dispensing means typically allow the directing of liquid and air into the cavity. In one embodiment the liquid and/or air dispensing means are in the form of jets or nozzles so as to pressurise the liquid and air which is dispensed.

In one embodiment an end wall of the housing includes an aperture through which the neck of the animal passes so that the animal's head is located outside of the housing and the remainder of the animal is located in the cavity.

In one embodiment when the housing is formed of the flexible sheet material there are provided a first part of the sheet material joined to a second part by attachment means which, in one embodiment are zips.

Typically, the first and second parts of the sheet material are located on the periphery of the base, in on embodiment permanently, and the zips are selectively operated so as to move the apparatus from a storage condition in which the zips are substantially open and the animal can be moved into and from the cavity, and an in-use position in which the zips are closed and sealed and at least the torso of the animal is located in the cavity to be washed, treated and/or dried.

In one embodiment the said first and second parts of the housing are moved from the storage position in which the same lies substantially at the periphery of the base on the respective side of the same to which they are attached to the in use position by moving the parts upwardly along the support members and then bringing the zip portions together and moving the same to the zipped sealed position to form, the housing cavity. In one embodiment a first zip extends from the base to a position on the underside of the animal's neck when in position in the cavity and a second zip extends from the rear of the housing towards the top side of the animal's neck which in position in the cavity.

Typically at the joins between the housing and the base, there are provided sealing means such as sealing gaskets which ensure that there is a substantially water tight seal of the cavity when the housing is in the closed position.

In one embodiment the apparatus is portable and can be carried in the storage position or alternatively may be carried in the in use condition and used as a carrying means for the animal located in the housing cavity.

In one embodiment other material such as shampoo, other cleaning treatments, or other chemical or medicine treatments are added to the liquid which is input to the cavity. In one embodiment the said other material is held in a container within the base and, when application of the same is required the user can adjust switching means which allow the container to be open to allow the said other material to be combined with other liquid such as water and applied into the cavity.

In one embodiment the user may purchase the said other material in a container which is of a form to be fitted into the base, or a container can be provided with the apparatus which can then be filled with the appropriate material and the container is then positioned in the base. Thus, the base includes a container for the storage of one or more cleaning or treatment liquids which can be selectively and progressively mixed with water which is introduced into the base and then introduced into the interior of the housing to be applied to the coat of the animal.

In one embodiment the introduction of the liquid, air and or other materials is selected and controlled by the user manually. In an alternative embodiment, the apparatus includes control means and which may, in one embodiment, include one or more predetermined cleaning, treatment and/or drying settings which can be selected by the user in order to allow the apparatus to automatically perform a sequence of cleaning, treatment and/or drying steps while the animal is located in the said cavity.

Typically, the support members are provided in an "n-shaped" form with the free ends of the same located at or adjacent to the base and connected to allow the water, treatment materials and/or air to be moved from the base and through the support members to spaced apart outlet apertures and into the cavity.

In one embodiment a locating portion is provided which when fitted in position is raised from the floor and which defines a stop against which part of the animal can locate when in the cavity so as to ensure that the animal is correctly positioned within the cavity of the housing.

In one embodiment, said locating portion position is adjustable with respect to its position in the cavity so as to allow adjustment of the apparatus for use with a particular animal or a particular size of animal.

In one embodiment, the housing includes at least one, but more typically a plurality, of ports located therein which allow the person performing the washing action to place their hands and wrists into the cavity of the housing so as to perform the washing, treatment and/or drying actions on the animal and/or secure the animal in the required position and/or comfort the animal. In one embodiment the ports are provided with sealing means such as flaps which fall over the ports when the same are not in use, and therefore seal the same and prevent excessive leakage of liquid from the cavity to the external environment. In one embodiment, direct contact is possible between the user's hand and the animal or, alternatively, a layer of sheet material is located between the said hand and the animal.

In one embodiment, the contact between the user's hand and the animal allows the improved washing, treating and/or drying of the animal and/or to allow a calming effect to be achieved on the animal by stroking the same and/or to maintain the animal in position in the cavity during the washing, treating and/or cleaning operations.

In one embodiment, the one or more walls in which the said ports are provided are formed of a double skin so as to enable to the user to pass their hand through the passage and maintain a substantially waterproof seal between the cavity and the external face of the apparatus.

In one embodiment as an alternative to the provision of support members, and one or more of the walls of the housing are formed by a flexible sheet material and when the animal is in position in the cavity, air is introduced to the cavity so as to cause the movement of the said sheet material away from the animal and allow the cavity to be retained by the force of the air in the in use position.

In one embodiment at least the top wall and/or other walls of the housing are double skinned and the gap between the layers is inflated by air which is introduced under pressure from an air source, such as, in one embodiment, a compressor so as to allow the housing to be maintained in the in-use position.

In one embodiment the compressor may be a separate item or alternatively may be included in the base.

In one embodiment, a display screen is provided to indicate to the user, the particular operating condition of the apparatus.

In one embodiment, the top wall includes or supports a module which allows water and/or air to be introduced from the top downwardly into the cavity and thereby impact on the animal during the washing, treating and/or drying so as to effectively act as a shower and possibly then a drier. In one embodiment, this module may be provided as an optional part.

In one embodiment, the apparatus may include one or more modules which are locatable with or integral with the side walls and/or end walls to allow water, treatments and/or air to be introduced into the cavity.

In one embodiment, the housing side walls, end walls and/or top wall are formed of transparent material so that the animal when in the cavity can be viewed and the animal has sight of the user of the apparatus and the external environment.

In one embodiment, the air, water and chemical treatment liquid inlets, outlets, heating means and pump means are located in the base so as to be separated, and preferably sealed from the cavity in which the animal is located during the washing, treatment and/or drying operations. Typically power is provided from a mains electricity supply but alternatively batteries or cells may be used to as to allow the apparatus to be used remotely from a mains power supply.

In one embodiment the apparatus can be selectively used in domestic premises so that an owner may wash and treat their pet or may be provided in a commercial premises or for commercial gain in which the commercial business owns the apparatus in accordance with the invention and either visits the homes of the animal owner, or the animal is brought to the commercial premises and the cleaning, drying and/or treatment is performed using the apparatus. In one embodiment different versions of the apparatus may be provided for different proposed uses.

In one embodiment, the size and volume of fluid and/or air which is supplied to the apparatus for use in the cleaning and drying operations, can be selected to suit the particular scale of the apparatus and also size of animal which is to be cleaned using the apparatus. Equally, the size of the means for introducing the liquid or air into the space in which the animal is located, can be selected to ensure that sufficient volume of air and liquid is provided to the animal location so as to perform a satisfactory cleaning and drying effect can be achieved relatively quickly while the animal is more likely to be passive when located in the space.

Furthermore, the washing and cleaning means can be directed and located with respect to the particular animal with which the apparatus is to be used so as to ensure that the desired cleaning and drying effect can be achieved on the animal and whilst taking into account the shape of the animal with which the apparatus is used.

The apparatus can be provided as a portable enclosure and which is best suited for smaller animals and the portable enclosure may also be used as a means of carrying the animal and with the apparatus then being usable to perform a washing and cleaning operation at a required location such as, for example, a show at which the animal is to be judged and thereby allow the animal to be cleaned and dried shortly before the showing occurs and/or used in a mobile pet grooming business.

Although the apparatus may be suitable for washing or treating any animal it is anticipated that the apparatus is of particular benefit when used with animals which are pets and in particular, although not exclusively, dogs and possibly cats.

In a further aspect of the invention there is provided apparatus for the performance of washing, treating and/or drying of an animal, said apparatus including a base assembly on which the animal stands during the washing, treating and/or drying operations, and a housing including sidewalls, end walls, and a top wall so as to define a cavity in which the animal stands, and means to allow water, cleaning treatments and/or air to be introduced from supply means and into the cavity to impact on the animal and hence allow the washing, treating and/or drying effect to be achieved and wherein the said walls are moveable between a storage position and an in-use position in which the cavity is defined so as to extend upwardly from the base assembly.

In a further aspect of the invention there is provided apparatus for the washing, treatment and/or drying of an animal in which there is provided a base, a plurality of support members which depend upwardly from the base and a housing which is located by the said support members and the base wherein the said apparatus includes means to introduce water and/or cleaning and/or treatment liquids into a cavity formed by the housing and base and in which the animal is located and means to introduce air into the cavity so as to provide a cleaning and drying effect and wherein the said means for introducing the water and air and draining the liquid are located within the said base and dispensing outlets for the water and/or cleaning and/or treatment liquids and/or air are located in said cavity.

In one embodiment the base also includes a reservoir for the storage of one or more cleaning or treatment liquids which can be selectively and progressively mixed with water which is introduced into the base from an external source and then introduced into the interior of the housing to be applied to the coat of the animal.

In one embodiment the water and/or cleaning and/or treatment liquids are introduced into the housing via a plurality of apertures which are provided in at least one of the support members.

In one embodiment the support members are provided in an "n" shaped form with the free ends of the same located at or adjacent to the base and connected to allow the water, cleaning and/or treatment liquid and/or air to be moved from the base and through the support members to the outlet apertures and into the cavity of the housing.

In a further aspect of the invention there is provided a method for performing a cleaning, treatment and/or drying procedure on an animal, said method comprising the steps of, providing apparatus including a base with a floor on which the animal is positioned when performing the said procedure, and wherein placing the animal on the floor with the housing in a storage, open position, moving the housing to an-in use closed position to form a cavity formed by the floor, side walls, end walls and top wall of the housing and in which the animal is located and enclosed, introducing cleaning and/or treatment liquid into the cavity to contact and clean and/or treat the coat of the animal, stopping the supply of said liquid and, if required, introducing air into the cavity under pressure to perform a drying procedure on the animal coat and when the procedure is completed, moving the housing to the storage open position and removing the animal from the apparatus.

In one embodiment, at any time during the procedure the person performing the procedure can place at least one hand through at least one port in the housing to contact the animal to reassure the animal and/or perform cleaning and/or treatment and/or drying operations.

In one embodiment at least the air is dispensed into the cavity and onto selected portions of the animal via a hand grippable and movable portion.

Specific embodiments of the invention are now described with reference to the accompanying Figures; wherein FIGS. 1a-g illustrate a first embodiment of apparatus in accordance with the invention;

FIGS. 2a-i illustrate details of the apparatus in accordance with the embodiment of FIGS. 1a-f;

FIGS. 3a-e illustrate the apparatus in a further embodiment of the invention in an open position ready for use;

FIG. 4 illustrates the apparatus of FIGS. 3a-e in an intermediate position;

FIG. 5 illustrates the apparatus in a closed in-use position;

FIG. 6 illustrates the components of apparatus in accordance with a further embodiment of the invention;

FIG. 7 illustrates apparatus of the embodiment shown in FIG. 6 formed in an in use position;

FIG. 8 illustrates the manner in which a range of different sizes of apparatus can be provided in accordance with the invention;

FIG. 9 illustrates the manner in which the apparatus of the embodiment of FIGS. 6-8 can be moved to a storage position;

Figure 2F:
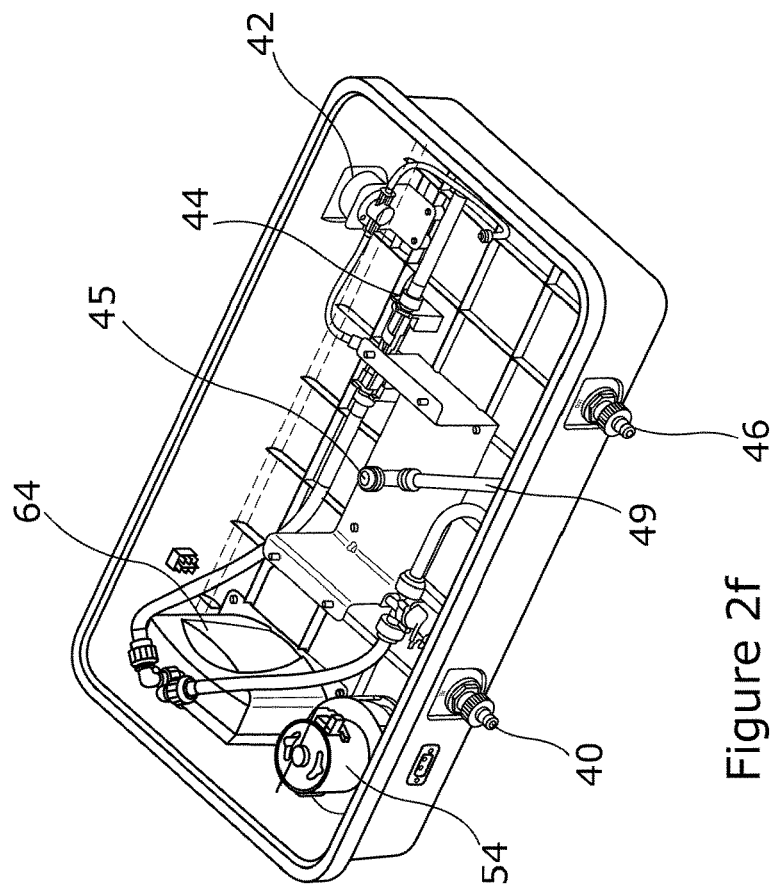

FIGS. 11a-d illustrates the air dispensing means in accordance with one embodiment of the invention and FIGS. 12a-d illustrate the movement of the apparatus of the embodiment of FIGS. 1a-2i between a storage, open position and a closed in-use position Referring now to the FIGS. 1a-g and 2a-i, there is illustrated apparatus 2 in accordance with one embodiment of the invention and which is shown in the closed in-use position. The apparatus includes a base 4 with support members in the form of upstanding n-shaped structures 6,8 which depend upwardly from the base 4 to define, in combination with a flexible sheet material envelope 11 a housing 12. The sheet material envelope is attached around the periphery 19 of the base. The floor 14 of the housing is formed as part of the base and is spaced from the lower wall 16 of the base so as to define, in combination with sidewalls 20,22, end walls 24,26 and top wall 27, a cavity 28.

The housing 12 flexible sheet material is held in the in use position by the upstanding structures 6,8 and is provided with a series of ports 30, which allow the passage of the persons hand and wrist into the cavity of the housing and a port 10 is also provided at the front end wall 24 to the animals head to pass out of the cavity 28. Flaps (not shown) are provided which located over the ports 30 when the hand and wrist not placed through the same to prevent the leakage of water therethrough.

Typically, a sealing mechanism, in this embodiment, zips 31, 33 are provided to retain the first and second parts 35, 37 of the housing in the closed sealed position.

Figure 2E:
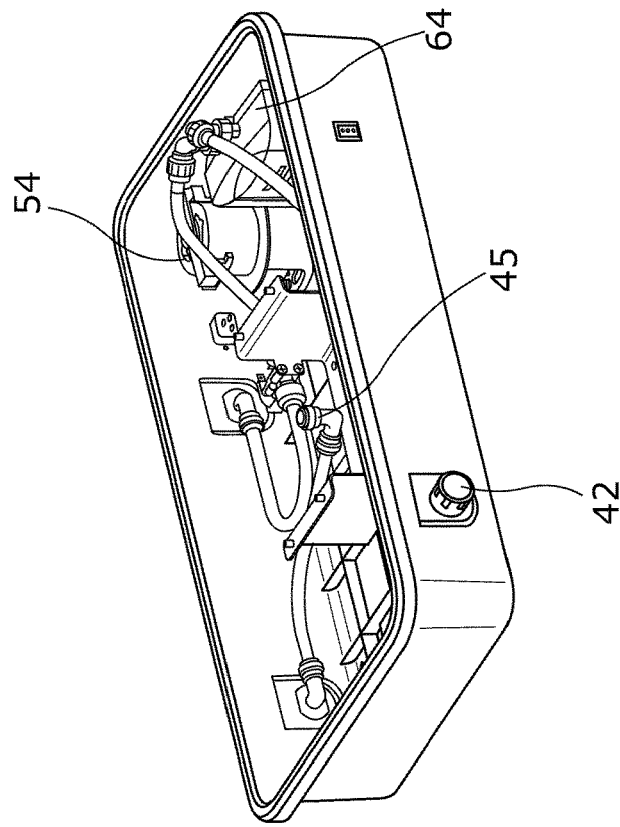
Figure 2G:
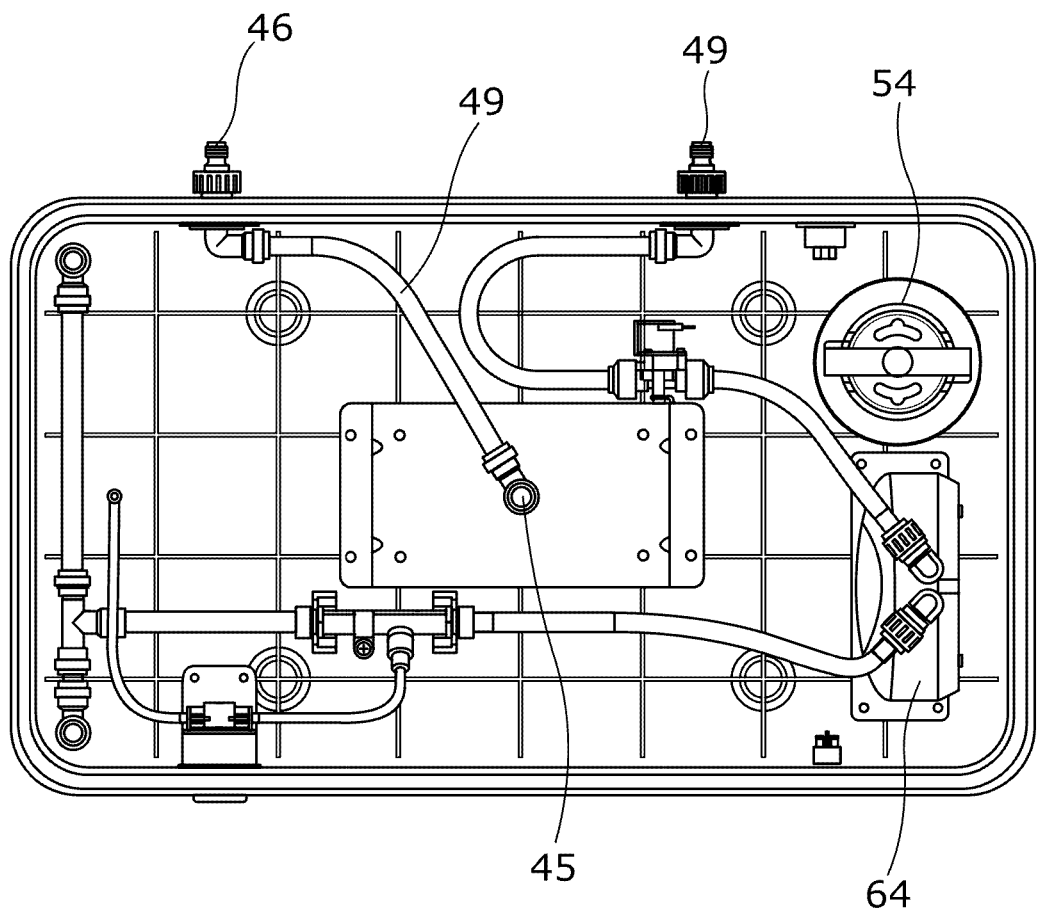
Figure 2I:
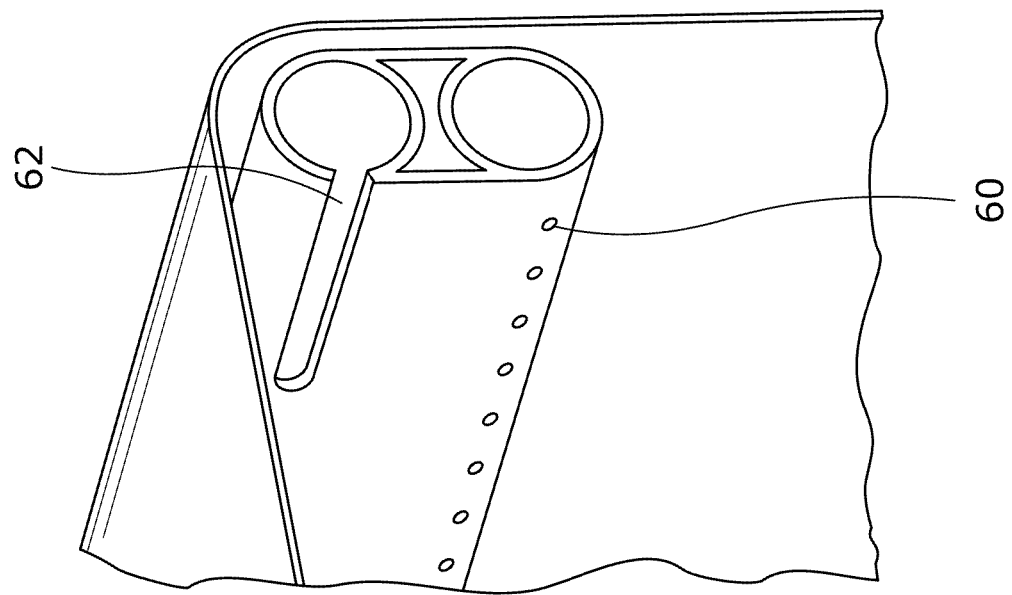

FIGS. 2c and d show the apparatus with the sheet material of the housing removed and FIGS. 2e-g show the base with the floor 14 removed for ease of illustration. In FIGS. 2c and d the support member 6,8 and the cavity 28 are shown. The cavity 28 defines the area in which an animal is located so as to be washed, treated and/or dried. The particular location of the animal can be assisted by the provision of a portion or plate 34 located on the floor 14 and is adjustable between a number of possible positions to take account of different sizes of animal, by selective attachment to respective engagement apertures 39,41,43. The portion 24 is typically located so as to be positioned at the rear legs of the animal and therefore encourage the animal to be positioned towards the front wall 24 of the housing with their neck and head positioned through the port 10. The portion 34 may therefore be relatively moveable with respect to the floor 14 as indicated by arrow 36 so as to allow the adjustment of the same to take into account the size and/or type of animal which is to be washed at that time.

Provided in the floor 14 is a drainage aperture 45 and the floor surface is formed so as to encourage liquid on the floor to drain towards the aperture 45 and then subsequently be stored within the base or more typically drained from the base to an external drainage facility. In the base 4 in the space between the floor 14 and lower wall 16 is a reservoir container location 38 for location of a material such as soap or other shampoos and/or treatments which can be selectively placed therein as and when required by the user. A treatment selector mechanism 42 is provided so as to be selectively operated by the user to allow, when switched on, the introduction of the material from the reservoir 38 via the dispenser 44 into the water supply which enters the base at inlet 40 so that a water and the other material mixture is introduced into the cavity. When the selector 42 is switched off only water enters the cavity which is to be performed at that time.

Also provided in the space in the base 4, is the drainage outlet 46 which allows water which has been used and drained from the floor 14 through aperture 45, to be removed from the base via hose connection 49. Both the inlet and outlet can be provided with standard hose connections to allow the connection of external supply and drainage apparatus.

Also within the base space, there is provided a heater 64 to allow the water to be heated prior to entering the cavity and also movement means for the drying air, in the form of a blower 54, to allow pressurised air to be introduced into the cavity via flexible hose 52 which is attached to a hand held gripping portion 48 illustrated in FIGS. 11a-d and which has a strap 51 for reception of the users hand and on the opposing face passages 53 through which the air is blown. Ridges 55 can be provided to allow a massaging effect to be provided as the portion 48 is passed across the coat of the animal to dry the same. Attachment means (not shown) may be included on, for example, the support members at spaced locations, to allow the attachment of the hand held gripping portion 48 therewith so as to locate the same in a position to allow the air to be introduced into the cavity and also allow the user to use both hands to manipulate the coat of the animal.

In addition, there may also be provided a power point in the base for apparatus to be plugged in and be passed into the cavity to be used to defur the animal's coat. The apparatus can be operated using a switch 57 to control the operation between on and off conditions and also to selectively operate the heater and blower of the apparatus.

Figure 2H:
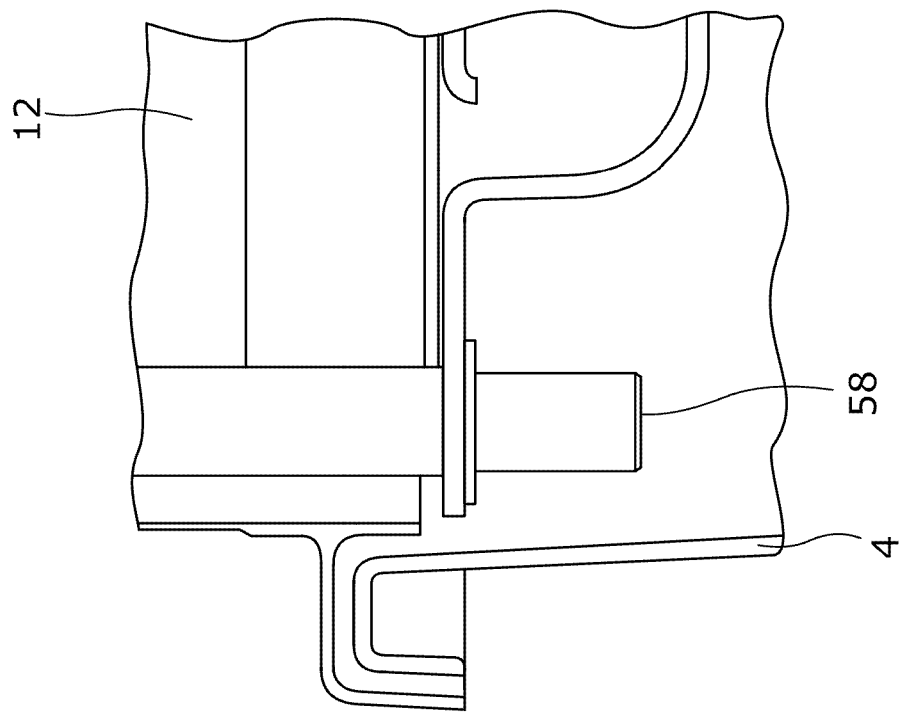

In this embodiment, the support members 6, 8, have passages therein which lead from openings 58 located within the base cavity as shown in FIG. 2h and which are formed along the interior of the structures to apertures 60 at spaced locations to which the water and/or treatment liquid passes so as to be and is dispensed into the cavity to be applied to the coat of the animal.

The operation of the apparatus may be manually controlled between off, washing, and drying modes or may be controlled to operate in pre-programmed sequences of operation which may be user selected with respect to, for example, the type of animal, the size of animal and/or cleanliness of the animal.

Referring now to the FIGS. 3-5 there is illustrated a further embodiment of apparatus 72 in accordance with one embodiment of the invention. The apparatus includes a base 74 which includes therein a drainage assembly which includes a tank 78. The apparatus also includes a cavity 76 located above the tank 8 and which is defined by a floor 80, side walls 82, 84, a front wall 86, a rear wall 88 and a top wall 90.

As shown in FIGS. 3a-e which illustrates the apparatus in an open position, the front and rear walls are formed of two parts, as is the top wall and when in the open position the said parts are separated so as to allow access for an animal into and from the cavity 78.

The apparatus 72 is provided with an inlet 92 to allow a liquid, typically water, and which may be heated, to be passed into connecting pipes and hence reach dispensing means such as jets 94, 96 which are provided in a spaced array configuration on the interior of the side walls 82, 84, front and rear walls 86, 88 and top wall 90 in this embodiment. The connecting pipes 98, 98' typically pass, as shown in broken lines from the inlet 92 to respective interfaces 100, 100' between the base 74 and the side walls 84, 86 and which is closed and sealed when the apparatus is in the closed position. From the interfaces 100, 100' the liquid passes to the dispensing means 96 typically passing between an inner layer which forms the wall of the cavity and an outer layer which forms the external surface of the apparatus housing 102.

With regard to the air inlet 104 then again connecting pipes 106, 106' lead from the same to respective interfaces 108, 108' which again, when the apparatus is closed allow the passage of air into the side walls between the layers and to dispensing means in the form of jets 110 which, in this embodiment are formed in the side walls 84, 86.

The drainage assembly also includes an outlet 112 which allows the removal of waste water, debris and treatment chemicals from the tank 78 during the cleaning operation or afterwards.

In order to allow the waste liquid and debris to reach the tank, the floor 80 is formed with a plurality of drainage apertures 114 therein which allow the passage of the liquid from the cavity 76 into the tank 78.

When the animal which is to be washed, treated and/or dried is placed onto the floor 80 with the apparatus in the open position shown in FIGS. 3a-e the doors 116 and 118 can be moved about hinges 120, 122 as indicated by arrows 124, 126 in FIG. 4 to an intermediate position and then to the closed position shown in FIG. 5. In the closed position there is defined an aperture 128 at the apex between the front wall 86 and the top wall 90 through which the neck of the animal is positioned so as to allow the head of the animal to be positioned externally of the cavity during the cleaning.

In order to ensure that the animal is positioned correctly in the cavity 76 with respect to the location of the water and air dispensing means and also to ensure that the animal can be comfortably located with their neck passing through the aperture 128, the floor 80 height can be adjusted as indicated by arrow 128 in FIG. 3b and/or the length between the front 86 and rear 88 walls can be adjusted to allow the size dimensions of the cavity to be adjusted to suit the animal with which the apparatus is to be used.

Figure 10:
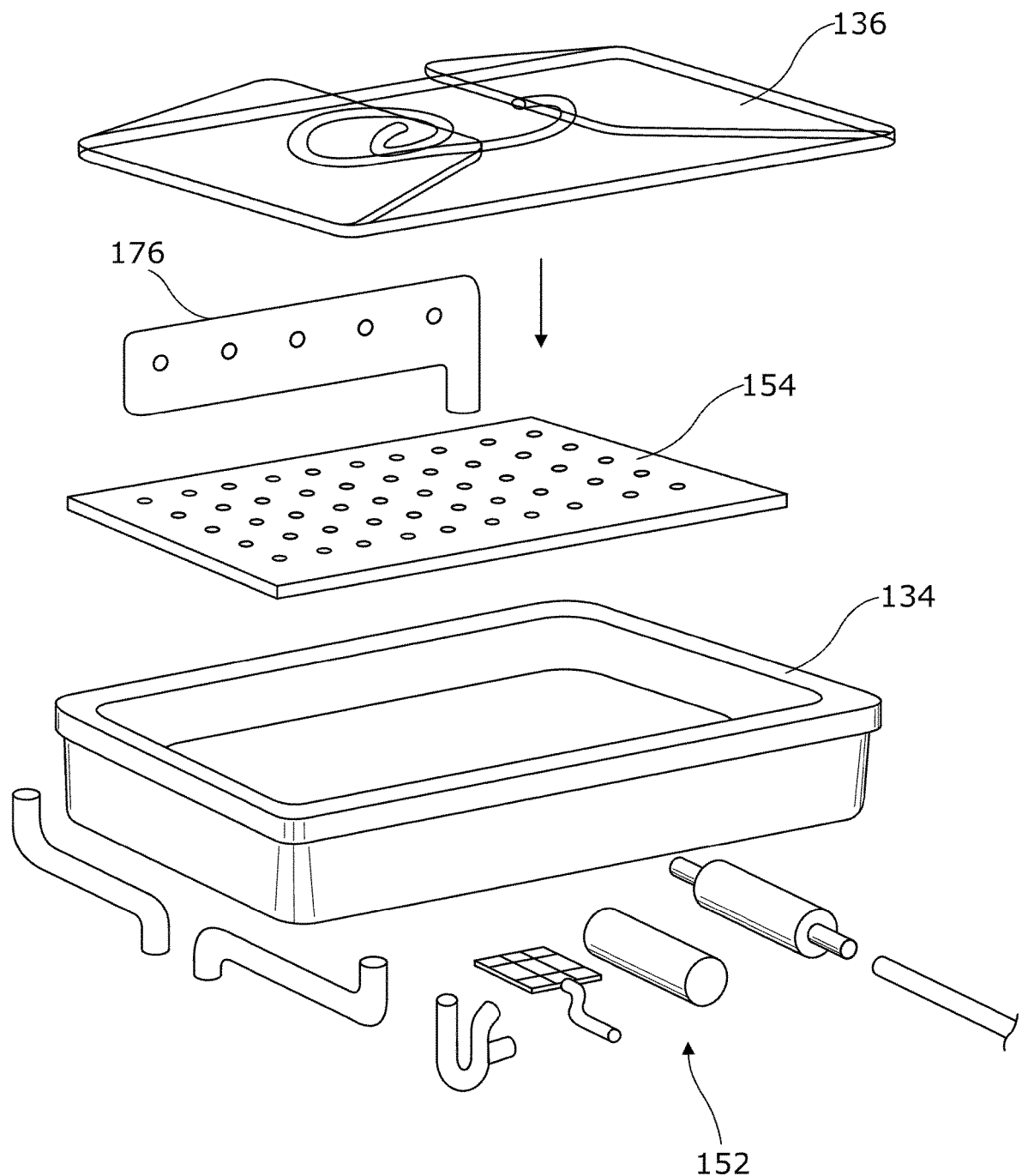
FIG. 10 illustrates a further embodiment of the invention.

Referring now to FIGS. 6,7 and 10 there is illustrated apparatus 132 with a base assembly 134 and a housing 136 in which sidewalls 138,140, end walls 142, 144 and top wall 146 are formed and which is formed of a flexible, transparent sheet material and which is provided to be attached to the base 148 assembly periphery 150 which is typically formed of a relative rigid material. The base assembly includes connection means for a series of components 152 to allow the drainage of the fluid which collects in the base to an external drainage apparatus. Also provided is a plate 154 with a series of apertures and the animal will stand on the base plate during use of the apparatus as illustrated in FIG. 8.

A module 156 is provided which is locatable on the top wall 146 of the housing as illustrated in FIG. 7 so as to allow the passage of water and/or air which is supplied to the module, from the module and downwardly as indicated by arrows 158 into the cavity which is formed when the sheet material of the housing is moved to the in use position as shown.

The material is typically moved to the in use position by the introduction of air into the cavity, typically via a pipe 160 as indicated by arrow 162 to thereby inflate the housing from the storage position shown in FIG. 6 to the position as shown in FIG. 7.

In the in-use position shown, the housing includes an aperture 164 for the passage therethrough of the neck 166 of the animal 168 as shown in FIG. 8 so that the body 170 of the animal is located within the cavity 172 formed between the base plate 154 and the walls of the housing 136. Also provided are a number of supply means 174 to allow air and/or water to pass through the sidewalls and into the cavity to allow the washing, treating and/or drying effect to be achieved and in FIG. 10, there is illustrated a module 176 which can be provided on the sidewall to allow the further introduction of water and/or air into the cavity 172.

Also provided, in this embodiment on the sidewalls 138,140, are a series of passages 174, which are normally held in a sealed position as shown, but which have cross slots or other means 176 to allow a person to move their hand and wrist through the passage and into the cavity 172 so as to allow them to contact the animal located therein, to perform washing, treating and/or drying manipulation on the animal's coat and/or to provide a calming effect on the animal when located in the cavity.

In one embodiment, the said walls of the housing are formed of a double ply sheet material so as to enable a sealing effect to be created around the wrist of the user when placing the same through the passage 174.

It will be appreciated that the apparatus can be provided in suitable dimensions for a particular range of animals and FIG. 9 illustrates a range of different sized apparatus 132 to suit different sizes, of, in this case, a dog.

FIG. 9 illustrates the manner in which the apparatus can be moved to a storage condition in which the housing 136 lies substantially flush with the top surface of the base assembly and this aids transportation and storage of a number of the apparatus as shown.

The apparatus, in which ever embodiment may also be used as a portable container which allows the container to be carried by hand to a particular location for use and, in one embodiment, the container can be used also as a means for transporting the animal, as well as a means for performing washing and cleaning operations on the animal once the apparatus is connected to a supply of fluid and air.

Figure 12A:
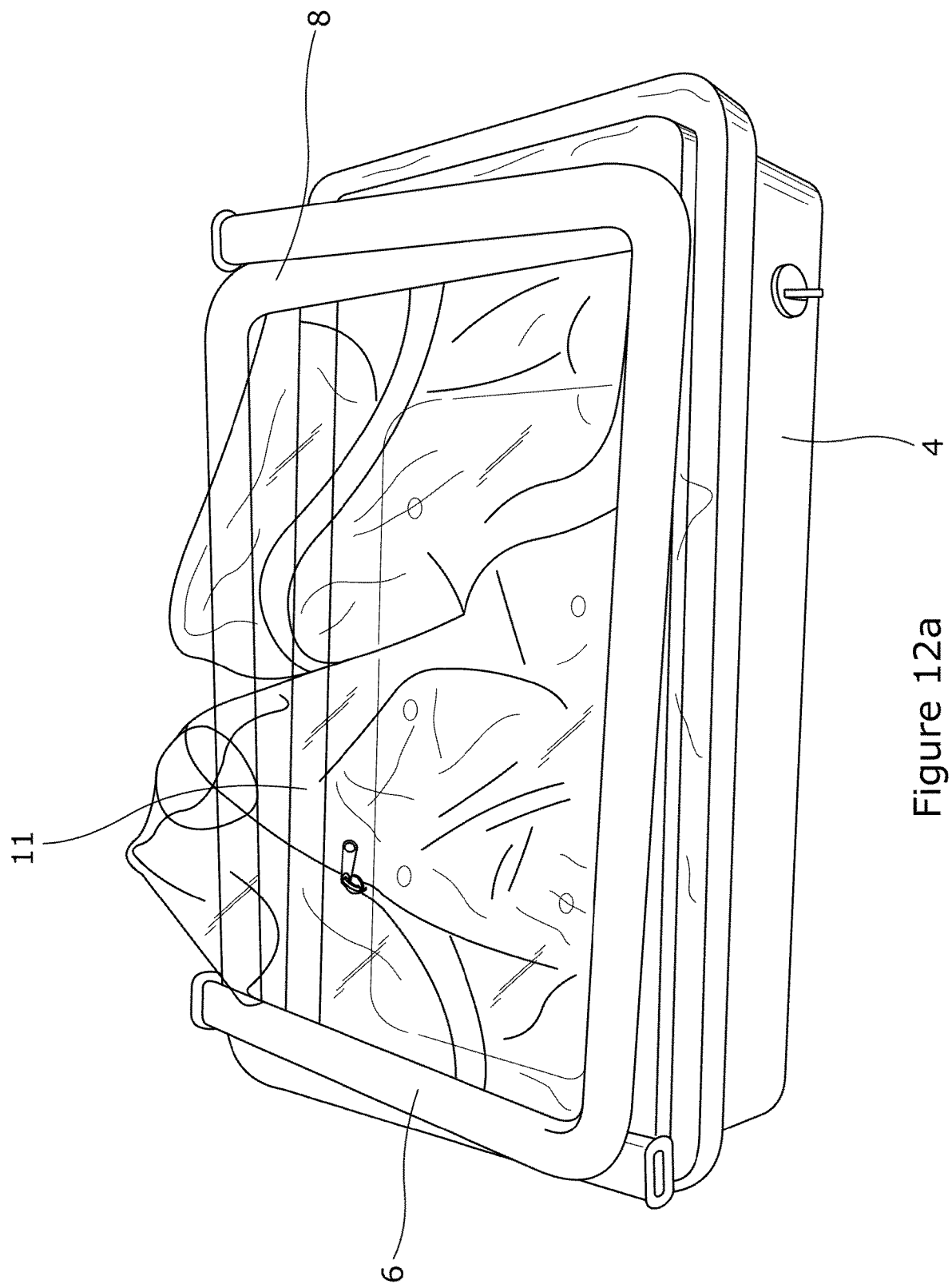
Figure 12B:
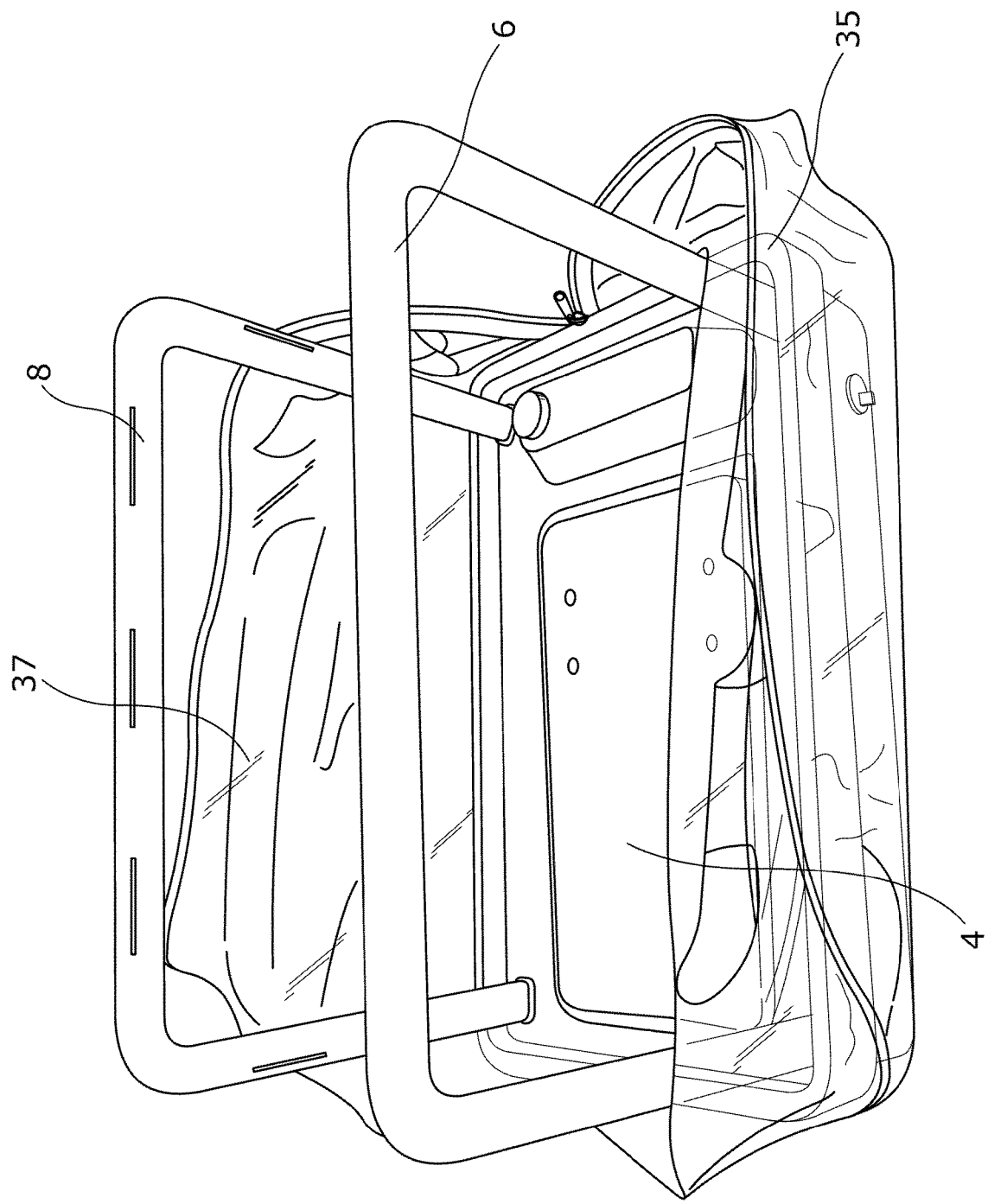
Figure 12C:
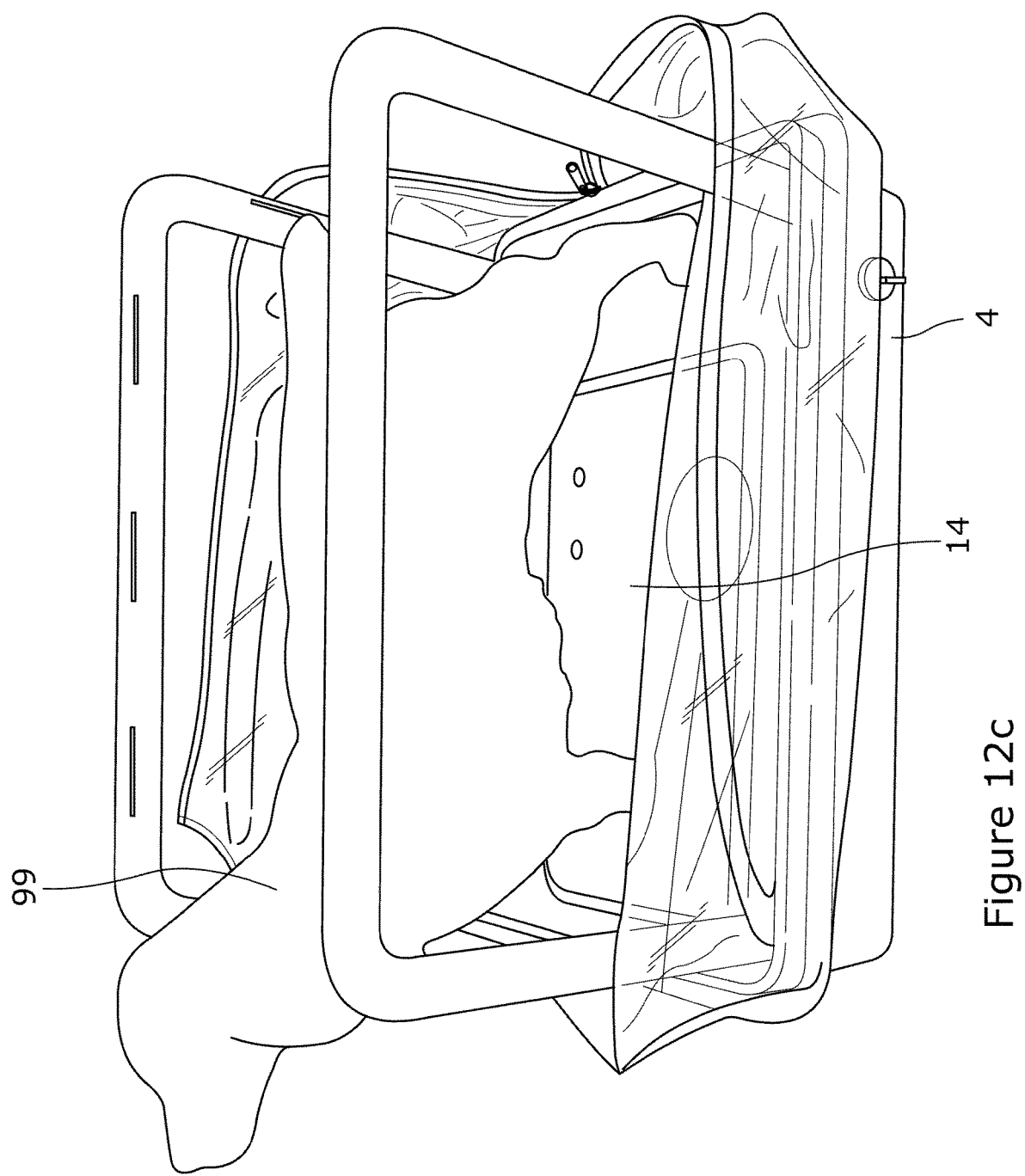
Figure 12D:
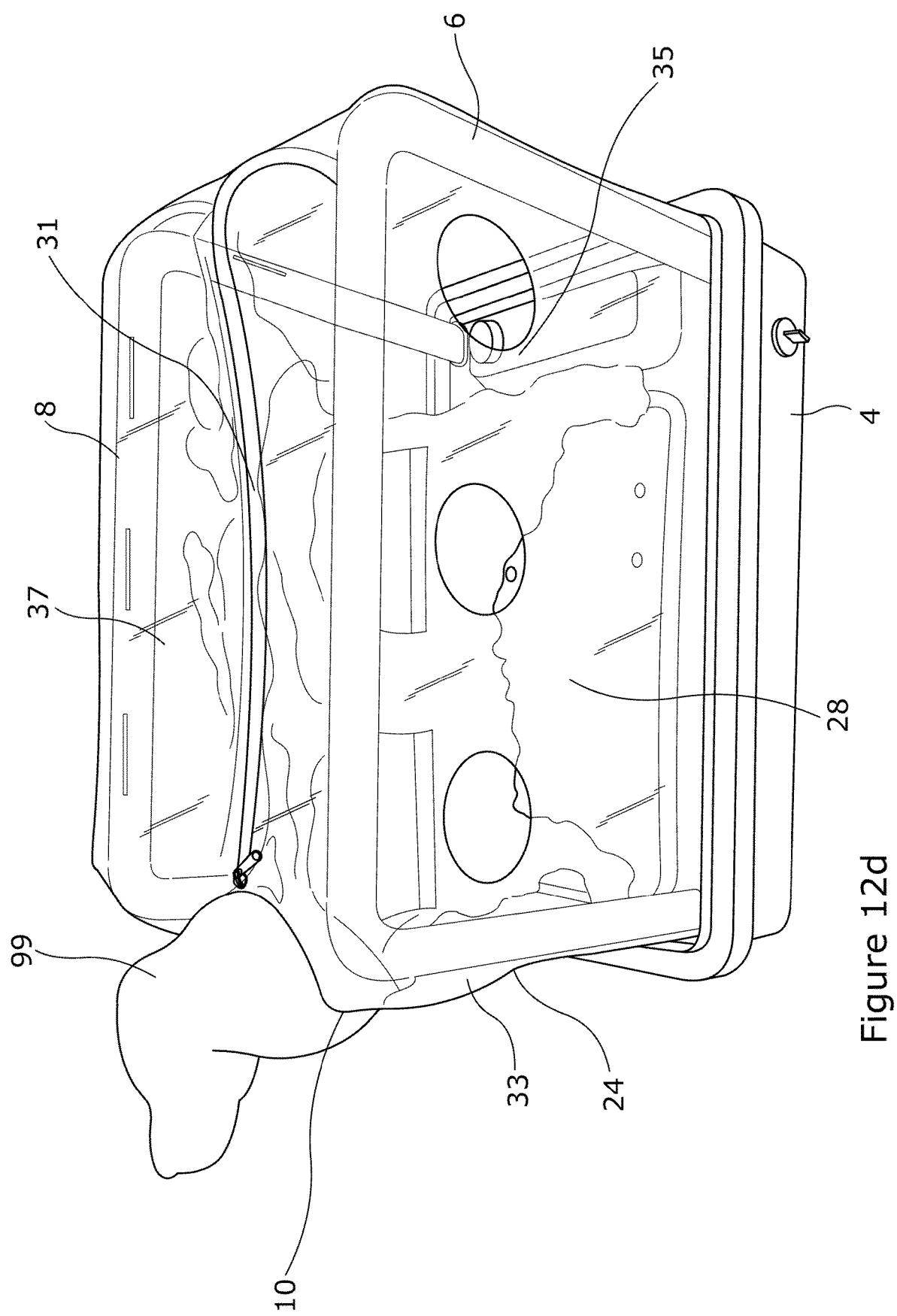

An example of moving the apparatus between storage, open; and closed, in use positions is shown FIGS. 12a-d and, is illustrated with regard to an embodiment of the apparatus which is similar to that shown in FIGS. 1a-2i and therefore uses the same reference numerals for the same parts. The apparatus is shown in the storage position in FIG. 12a and it will be appreciated that the same can be moved to a relatively small size by removing the support members 6,8 from the base and opening the zips 31 and 33 and folding down the parts 35, 37 of the sheet material envelope 11 towards the base 4. To move the apparatus to the in-use closed position then the support members 6, 8 are engaged with the base 4 as shown in FIG. 12b and the animal, in this case a dog 99, is moved onto the floor 14 of the base 4 to a position shown in FIG. 12c. When in position, the portions 35, 37 of the housing are moved upwardly and over the support members so that the sheet material 11 is supported and bring the zip edges of the parts 35, 37 into an adjacent position. When this is achieved, the zips 31, 33 are closed to engage the parts 35,37 together and thereby form the cavity 28 in which the animal is located, with the head and neck placed through the port 10 formed in the front wall 24 of the housing and between the ends of the zips 31,33 as shown in FIG. 12d. When this has been achieved, the apparatus is ready for the cleaning procedures, which typically will be an initial rinse and then shampoo and water followed by a rinse, and/or treatment which may be applied after the second rinse or, if no shampoo is used, after the first rinse, and then subsequent drying in which the liquid flow is stopped and the user can then move the hand held portion to direct the air over the coat of the animal to dry the same. When the procedures are completed the steps from 12d-b are performed so as to allow the free movement and removal of the animal from the apparatus.

It will therefore be appreciated that the apparatus may be provided in different versions. The different versions may be, for example, any or any combination of, different versions for use with different types of animal, different versions for specific size ranges of animal and/or different versions of control ranging from a manually operable version through to a versions which have pre-programmed control options for different cleaning and/or treatment options.

There is therefore provided in accordance with the invention apparatus which allows the controlled and less stressful performance of cleaning and/or treatment of an animal whilst improving the effectiveness of the performance of the cleaning and thereby reducing wastage of water and treatment chemicals and also reducing the risk of the animal causing damage to the premises after the cleaning has been performed.

The invention claimed is:

1. Apparatus for performing cleaning, treatment and/or drying of an animal, said apparatus including a housing and base defining a cavity in which the said animal is located, a supply of liquid, means for dispensing the liquid into the said cavity and onto the said animal and a drainage assembly to allow the liquid to be removed from the said cavity, wherein said base includes a floor on which the animal stands, sits or lies and a space below the floor in which the drainage assembly is located, and wherein liquid and/or air is dispensed into the cavity from one or more nozzles or outlets which are located in a pre-set configuration and which face inwardly to the cavity, the said one or more nozzles or outlets located on support members which extend upwardly from the said base, and wherein the support members are provided in an "n" shaped form with the free ends of the same located at or adjacent to the base and connected to allow the water, cleaning liquid and/or air to be moved from the base and through the support members to the outlet apertures and into the interior of the housing.

2. Apparatus according to claim 1 wherein the apparatus includes an inlet for introducing pressurised air into the housing and directing means to direct the air onto the said animal while positioned in the cavity.

3. Apparatus according to claim 2 wherein the said air is heated prior to being introduced to the apparatus or the apparatus includes at least one heater through which the air passes so that heated air is applied to the animal.

4. Apparatus according to claim 1 wherein at least one portion of the housing is selectively moveable so as to allow the configuration of the cavity to be adjusted to the size of the animal located in the cavity at that time.

5. Apparatus according to claim 1 wherein a member located on the said floor is selectively moveable and acts as a guide for the position of the animal within the cavity to provide the most effective washing, cleaning and/or treatment.

6. Apparatus according to claim 1 wherein the housing includes side walls, end walls and a top wall which are located in an in use position by said support members.

7. Apparatus according to claim 6 wherein the side walls, end walls and top wall are formed of a flexible sheet material.

8. Apparatus according to claim 1 wherein the housing includes one or more doors which are capable of being moved between an opened position to allow access into and from the cavity and a closed position in which the cleaning, treatment and/or drying of the animal occurs.

9. Apparatus according to claim 1 wherein side walls, end walls and a top wall of the housing are provided of two layers which define a gap therebetween, a first layer forming an inner surface of the cavity and the second layer forming an external wall of the housing.

10. Apparatus according to claim 1 wherein connection tubes or pipes are connected with inlets for the supply of liquid and/or air from externally of the housing to dispensing means internally of the housing.

11. Apparatus according to claim 10 wherein the said connection pipes, inlets and outlets are located substantially within the base of the apparatus.

12. Apparatus according to claim 11 wherein the connection pipes or tubes extend from the said base into the housing so as to allow the dispensing and pattern of application of liquid and/or air to be across the surface of the animal when located in the cavity.

13. Apparatus according to claim 1 wherein a wall of the housing includes an aperture through which the neck of the animal passes so that the animal's head is located outside of the housing and the remainder of the animal is located in the cavity during the washing treatment and/or drying.

14. Apparatus according to claim 1 wherein the apparatus is movable between storage and in-use conditions.

15. Apparatus according to claim 14 wherein side walls, end walls and a top wall of the housing are provided of a flexible sheet material such that when the animal is in position in the cavity, air is introduced to the cavity so as to cause the movement of the said sheet material away from the animal and allow the cavity to be formed in the in-use position.

16. Apparatus according to claim 14 wherein side walls, end walls and a top wall of the housing are double skinned and a gap between the layers is inflated by air which is introduced under pressure from an air source so as to maintain the housing in the in-use position.

17. Apparatus according to claim 1 wherein one or more containers are provided with the apparatus to receive therein a supply of shampoo, or other treatment materials for the animal.

18. Apparatus according to claim 1 wherein the apparatus includes control means and a power supply which allow a user to control any or any combination of, switching on or off of the apparatus, selecting which of liquid or air is to be dispensed, and switching on and off of heating means.

19. Apparatus according to claim 18 wherein the apparatus includes one or more predetermined settings which can be selected by the user to allow a predefined sequency of cleaning, treatment and/or drying to be performed.

20. Apparatus according to claim 1 wherein a user is able to place their hands internally of the housing during the cleaning, drying and/or treatment operation so as to manipulate the surface of the animal to cleaned, treat or dry the same and/or direct the flow of liquid and/or air onto the animal and/or calm the animal.

21. Apparatus according to claim 20 wherein the upper portion includes one or more passages which allow the user to place their hand and part of their arm through the same and into the cavity with the hand exposed to manipulate the animal's surface.

22. Apparatus according to claim 21 wherein the one or more passages includes sealing means which seal against the portion of the arm so as to substantially prevent the movement of liquid from the cavity to the external environment.

23. Apparatus according to claim 1 wherein at least part of the housing is formed of a substantially transparent material to allow a user to view the cavity and the animal within the same and for the animal to view externally of the cavity.

24. Apparatus according to claim 1 wherein a top wall includes or supports a module to allow water and/or air to be introduced from the top of the cavity downwardly into the cavity.

25. Apparatus according to claim 1 wherein the base also includes a reservoir for the storage of one or more cleaning and/or treatment liquids which can be selectively and progressively mixed with water which is introduced into the base from an external source and then introduced into the cavity of the housing to be applied to the coat of the animal.

26. A method for performing a cleaning, treatment and/or drying procedure on an animal, said method comprising the steps of, providing apparatus including a base with a floor on which the animal is positioned when performing the said procedure, and wherein placing the animal on the floor with the housing in a storage, open position, moving the housing to an-in use closed position to form a cavity formed by the floor, side walls, end walls and top wall of the housing and in which the animal is located and enclosed, introducing cleaning and/or treatment liquid into the cavity to contact and clean and/or treat the coat of the animal, stopping the supply of said liquid and, if required, introducing air into the cavity under pressure to perform a drying procedure on the animal coat and when the procedure is completed, moving the housing to the storage open position and removing the animal from the apparatus wherein the liquid and/or air is dispensed into the cavity from one or more nozzles or outlets which are located in a pre-set configuration and which face inwardly to the cavity, the said nozzles or outlets located on support members which extend upwardly from the said base, and wherein the support members are provided in an "n" shaped form with the free ends of the same located at or adjacent to the base and connected to allow the water, cleaning liquid and/or air to be moved from the base and through the support members to the outlet apertures and into the interior of the housing.

27. A method according to claim 26 wherein a person performing the procedure can place at least one hand through at least one port in the housing to contact the animal to reassure the animal and/or perform cleaning and/or treatment and/or drying operations.

* * * * *